United States Patent Office 3,500,373
Patented Mar. 10, 1970

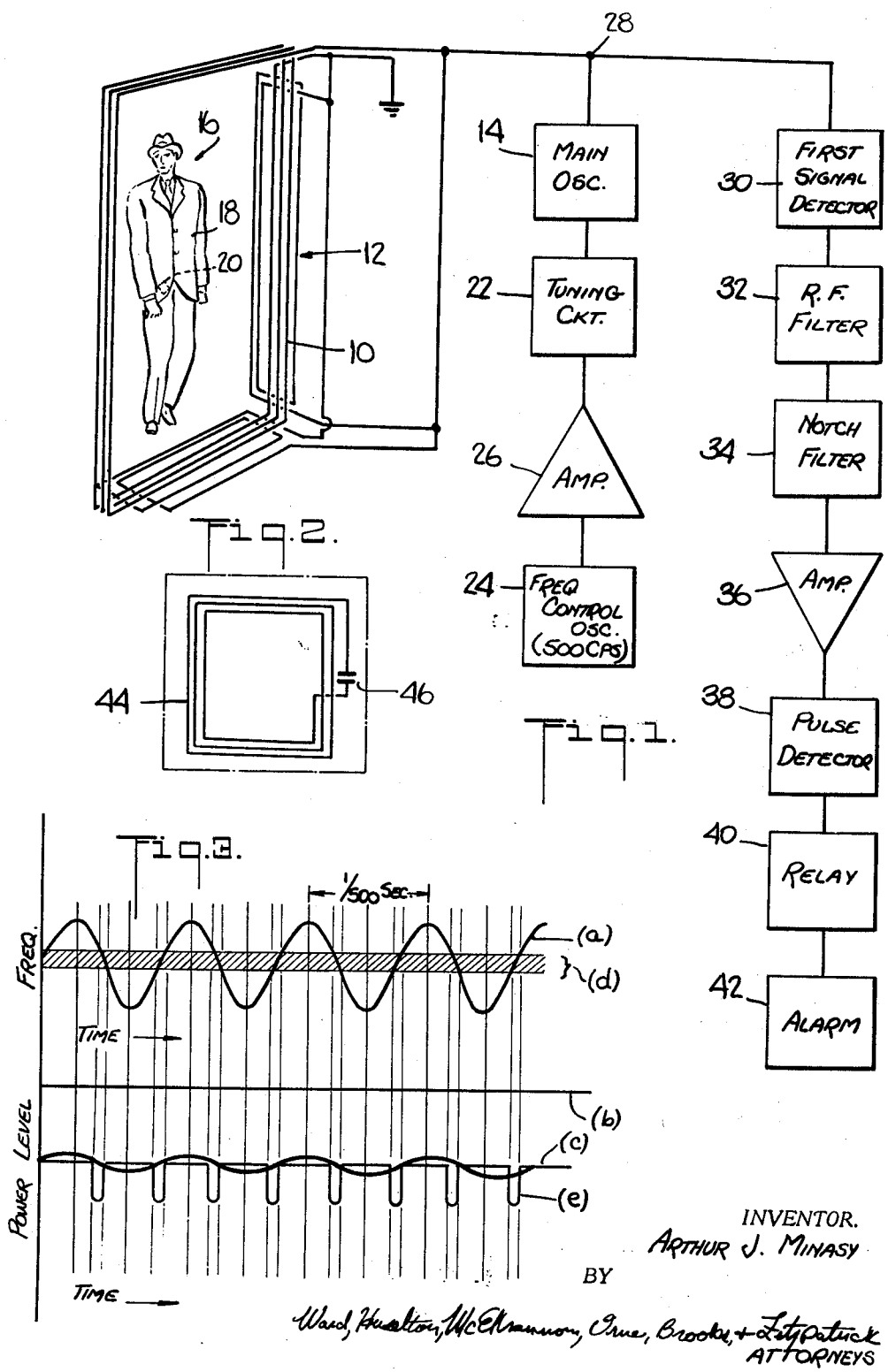

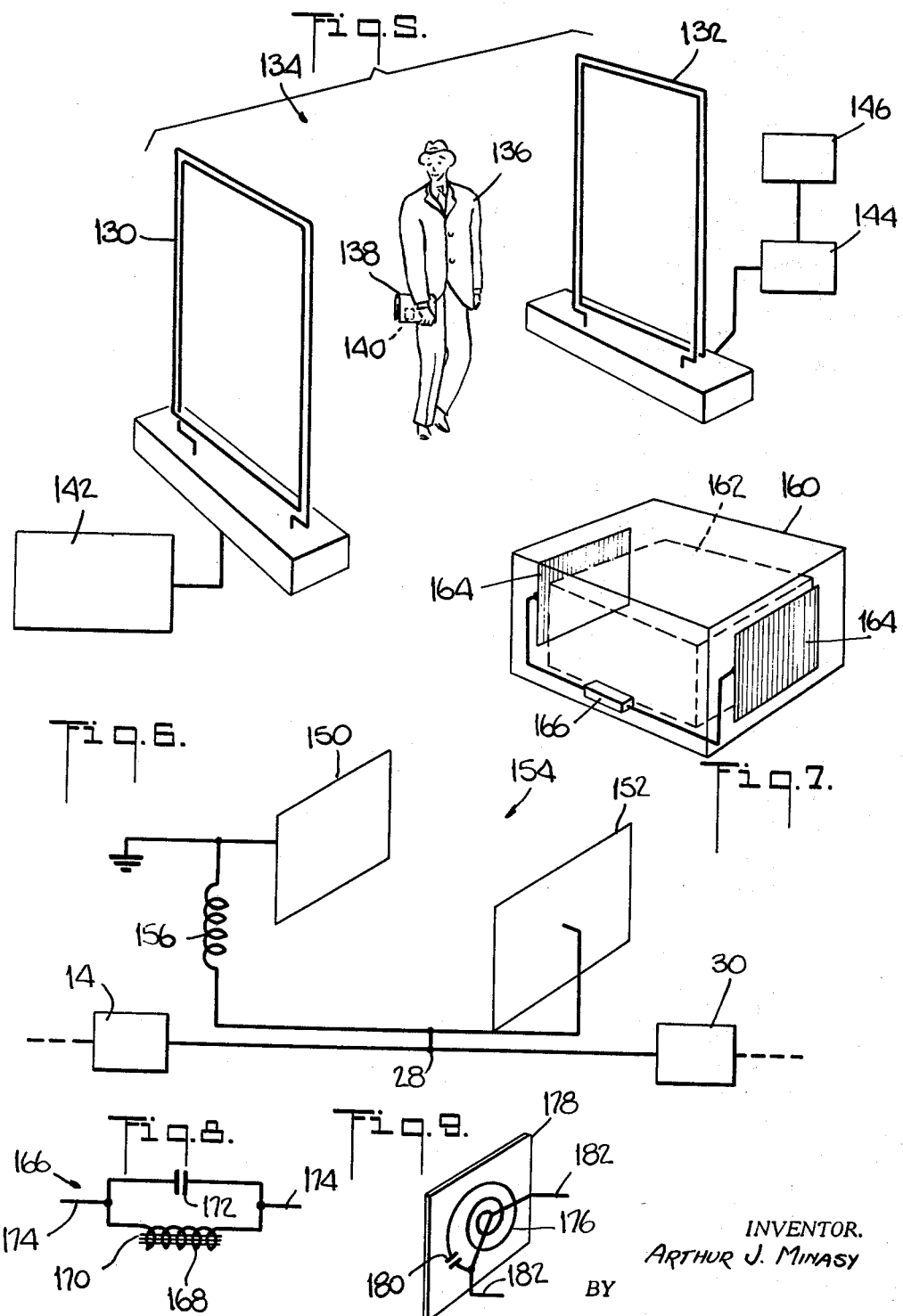

3,500,373
METHOD AND APPARATUS FOR ARTICLE THEFT DETECTION
Arthur J. Minasy, Woodbury, N.Y., assignor, by mesne assignments, to The National Bank of North America, as trustee, a national banking association
Filed May 6, 1966, Ser. No. 548,314
Int. Cl. G08b 13/00
U.S. Cl. 340—258        20 Claims

ABSTRACT OF THE DISCLOSURE

A theft detection system wherein a resonant electrical circuit affixed to articles to be protected, electromagnetic waves are generated at a checkpoint and are caused to sweep repetitively at a given rate through a frequency range including the resonant frequency of the circuit attached to the protected articles and wherein changes in energy level which occur at the repetition rate are detected.

---

This invention relates to detection systems and more particularly it concerns novel arrangement for reliably indicating the passage of articles past given checkpoints.

Various techniques have been developed in the past for monitoring checkpoints, such as the exits of stores, in order to prevent the unauthorized taking of articles of merchandise out of the store or other protected area. Some of these techniques utilize radiating electromagnetic energy which is reflected, absorbed, or otherwise transformed by miniature electronic circuits imbedded in or otherwise affixed to the "protected" articles. The effect which the miniature electronic circuit produces on the transmitted energy is monitored continuously, and when a change occurs due to the movement past a checkpoint of an article bearing the electronic circuit, an alarm is sounded.

It is, of course, quite important that the electronic circuits which are attached to the protected articles of merchandise be as small as possible and that they be made up of only small and inexpensive components. Systems have been developed wherein the circuits to be attached to protected articles comprise only a small piece of metal of a special size and shape to form a resonant circuit. These systems transmit continuously in the vicinity of the checkpoint at the resonant frequency of the circuits attached to the merchandise. When an article of merchandise bearing such circuit or piece of metal passes through the checkpoint, the circuit begins to resonate as a result of the transmitted energy. This in turn causes absorption of a portion of the energy in the vicinity of the checkpoint. Means such as a grid dip meter are provided to monitor such changes in ambient energy level and to sound an alarm when the level drops as a result of its absorption by a resonant circuit passing through the checkpoint.

A major difficulty encountered in connection with prior systems of the above type, lies in the fact that the frequency sensitivity of the energy level monitory equipment is quite low. A a result, many articles of "unprotected" or "authorized" merchandise, (i.e., articles of merchandise which may not be carrying the resonant electronic circuits), would cause the alarm to be triggered upon passing through the checkpoint. This occurs because many objects made of metal will absorb radiated energy to a certain degree irrespective of the size or configuration of the metallic portions of the object. Thus, prior systems are often incapable of distinguishing "protected" from "unprotected" articles. While it is undesirable when "protected" articles pass through a monitory checkpoint undetected, it is often even more undesirable when false alarms are sounded when unprotected or authorized articles pass through.

The frequency insensitivity of energy level meters is in part caused by the fact that they are required to note changes in overall energy level while only sampling a small portion of the total energy. In order to do this, the basic energy level sensitivity of the meter must be raised to a very high degree; and this in turn renders the meter less capable of distinguishing between changes in energy level at one frequency and changes at another nearby frequency.

The present invention overcomes all of the above discussed difficulties. With the present invention, it is possible to protect articles by means of very simple, inexpensive and compact electronic circuits. These circuits may comprise only a simple coil and capacitor packaged in a card-like element easily attached to or integrated with an article to be protected. The present invention moreover makes it possible, without resorting to the transmission of large amounts of power, to detect only those articles which are "protected" and to ignore the unprotected articles.

In one of its aspects, the present invention involves the transmission of energy at swept frequencies. That is, energy is transmitted continuously at a checkpoint, but its frequency is shifted cyclically. As a result, a tuned resonant circuit in the presence of this energy will resonate and absorb energy by different amounts during different portions of the frequency shift cycle. Thus irrespective of the total amount of energy absorbed by the circuit, it will produce variations in energy absorption from one portion of the cycle to another. Means are provided to monitor these changes in absorbed energy as opposed to the total amount of energy absorbed. Thus, the sensitivity of the system is made dependent, not upon the total amount of energy absorbed, but rather upon how frequency selective the absorbing object is. The embedded resonant circuits can be made far more frequency selective than the articles they are protecting. Thus even if the articles themselves absorb more energy than do their protecting circuits, the fact that the articles are not as frequency selective as the circuits will prevent them from actuating the alarm. This is because no changes in energy absorption level will take place as the transmitted frequency is shifted.

In another aspect the present invention makes use of the fact that under certain conditions, the electro-magnetic energy fields developed about an antenna can be made to be principally inductive in nature as opposed to radiative. In most prior systems where electro-magnetic energy is to be generated, efforts are expended to lower energy present in the inductive fields which always return to the antenna, and to increase the energy level of the radiative fields which dissociate from and leave the antenna. In the present invention however, the transmitting antenna is arranged and the frequencies are chosen such that the fields developed are primarily inductive or capacitative. Thus the energy developed by the antenna always returns to the antenna. No energy is lost except that which may be absorbed by an article passing through the inductive and/or capacitive field, or which may be dissipated through the production of a secondary off resonance condition by the article. As a result, by measuring the amount of energy which returns to the antenna, a very accurate indiction can be obtained of the amount of energy which became absorbed in an article passing through the field.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 1 is a diagrammatic and partially pictorial representation of a system which embodies the present invention;

FIG. 2 is an enlarged view of a frequency selective energy absorption device useful in connection with the present invention;

FIG. 3 is a series of waveforms useful in understanding the operation of the present invention;

FIG. 5 is a view similar to FIG. 1 but showing an alternate coil arrangement;

FIG. 6 is a view similar to FIG. 1 but showing a different means for generating electromagnetic fields;

FIG. 7 is a perspective view showing an alternate arrangement for protecting an article according to the present invention;

FIG. 8 is a circuit diagram of a portion of the arrangement of FIG. 7; and

FIG. 9 is a diagram of an alternate circuit forming a portion of the arrangement of FIG. 7.

Figure 4:
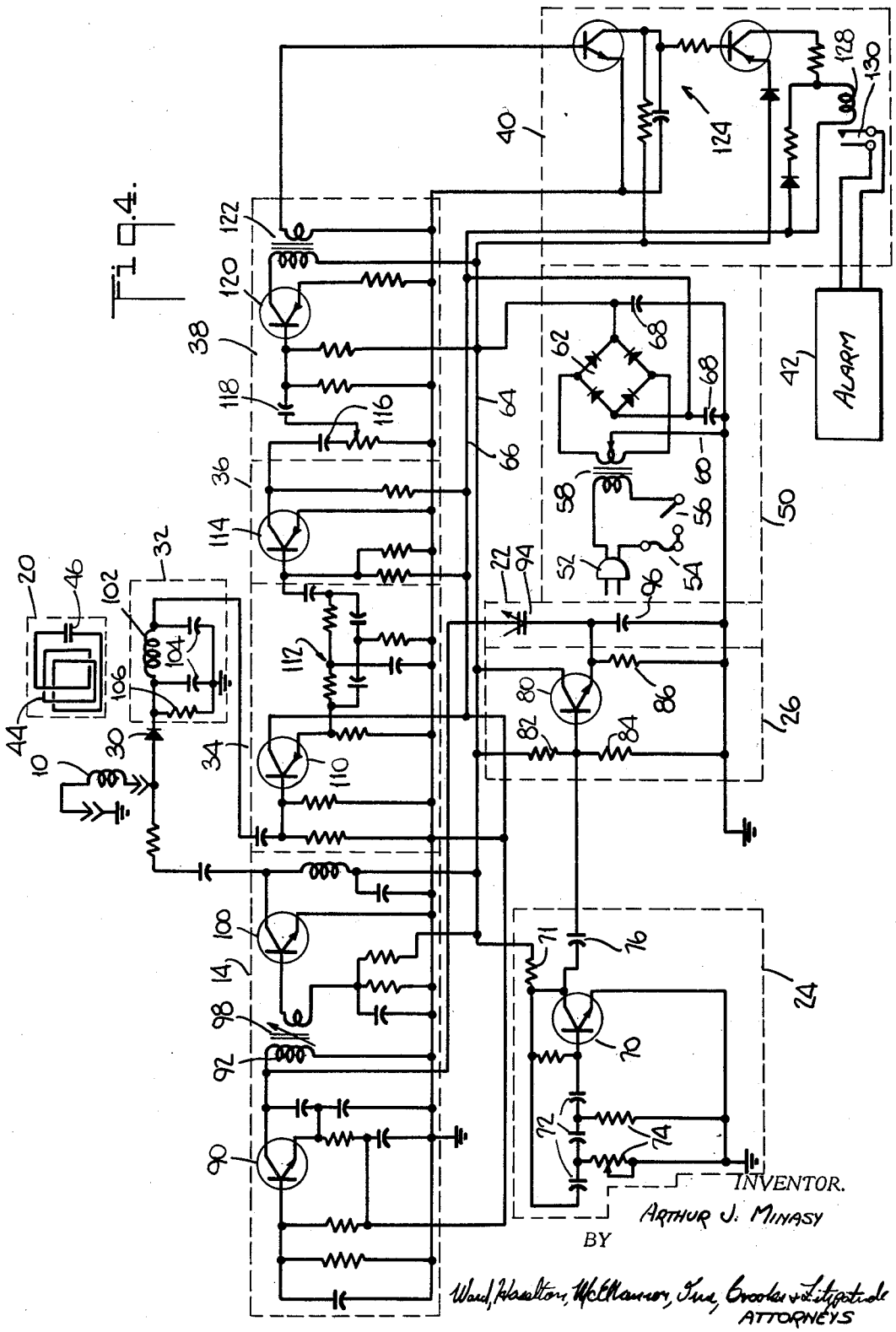
FIG. 4 is a detailed circuit diagram showing one version of the various components of the system of FIG. 1.

As shown in FIG. 1 there is provided a coil 10 in the vicinity of a checkpoint 12. The checkpoint 12, as shown, may be a doorway or other entrance or exit passage. Particularly good results have been achieved when the coil 10 is wound around the checkpoint 12 as shown so that everything and everybody passing the checkpoint must go through and be surrounded by the coil 10. Secondary coils 12a and 12b are also placed in the vicinity of the checkpoint 12 with their axes transverse to that of the coil 10. This ensures that the coil fields are such that at least one of them will intercept a planar element passing through the checkpoint no matter what its orientation might be.

The coil 10 receives energizing current from a main oscillator 14. The oscillator 14 is continually shifted in frequency as will be discussed more fully hereinafter. However its center frequency for the illustrative application is in the vicinity of one megacycle. This frequency is chosen in part because of the fact that it may be employed without requiring a special operating license. However this frequency is also advantageous due to the fact that for the size of the antenna used (i.e., about three turns around a doorway), the far greater percentage of magnetic fields produced by currents flowing through the coil, will collapse on the coil when the current is reversed through it. Conversely a relatively small percentage of the energy is lost through radiation. The significance of this is that the energy involved in operating the system is nearly completely controlled and can therefore be monitored more accurately. This contrasts with systems which radiate energy from a checkpoint and then attempt to monitor changes in the energy produced by an object passing through the checkpoint.

FIG. 1 illustrates a man 16 about to pass the checkpoint 10 through the coil 12. The man 16 is wearing a "protected" jacket 18. This jacket has attached to it a wafer 20 (shown in dotted outline) which has an electric circuit printed thereon. The wafer 20 may take the form of a card or label having identification, price and/or size information thereon. The wafer-label is removed or deactivated by a sales clerk when a legitimate sale is made. However, when the wafer is not removed or deactivated, it affects the magnetic field in the vicinity of the coil 10 to produce an alarm signal as will be described.

The oscillator 14 is varied in frequency between about 0.8 and 1.2 megacycles by means of a tuning circuit 22. This frequency shift takes place at about 500 cycles per second and follows a sinusoidal pattern. A frequency control oscillator 24 and an amplifier 26 are provided to achieve this frequency shift in the main oscillator 14.

The signals from the main oscillator 14 are supplied to a junction 28 from which they proceed to the coil 10 and to a first signal detector 30.

The first signal detector 30 monitors the energy level of the signals at the junction 28. This energy level will vary as energy is withdrawn or dissipated out through the coil 10. During normal operation i.e., with no "protected" article in the vicinity of the passageway 12, the energy level at the junction 28 will remain substantially constant, and at a level near the output level of the main oscillator 14. This is because, as indicated above, nearly all of the energy which goes into the establishment of a magnetic field around the coil 10 is recovered as the field collapses back into the coil as the current is reversed. Very little of the energy is lost through radiation.

When a "protected" article bearing a wafer 20 passes through the checkpoint 12 however it absorbs some of the energy in the magnetic field so that not all of the field energy is recovered at the junction 28 as it collapses back into the coil 10. This depletion of energy is sensed by the first signal detector 30.

As will be described more fully, when a "protected" article (i.e., the jacket bearing the wafer 20), moves through the checkpoint 12, the surrounding electromagnetic field is absorbed by the wafer in surges. These surges, as seen by the first signal detector 30, are in the form of negative going pulses. These pulses are passed through an R-F filter 32 which removes the frequency components of the main oscillator 14. The output of the R-F filter 32 is then passed through a 500 cycles per second "notch" filter which removes the 500 cycles frequency components produced by the frequency control oscillator 24. This output is then amplified in a pulse amplifier 36 and passed through a pulse detector 38. The pulse detector 38 is in effect a further filter which responds only to changes in signal level which occur at the rate at which the swept frequency crosses through the resonant frequency spectrum of the wafer 20. As will be seen, this rate is twice the oscillatory rate of the frequency control oscillator 24, or about 1000 times per second. The output of the pulse detector energizes a relay 40 which in turn closes a circuit to actuate an alarm 42.

The wafer 20, which is attached to the jacket 18 or any other article of merchandise to be protected, is made up of a simple electrical circuit which, as shown in FIG. 2, comprises a coil 44 and a capacitor 46 connected to form a resonant loop. The resonant frequency of the loop is chosen to be within the range of frequencies through which the main oscillator 14 is swept. The frequency sensitivity or selectivity of the resonant loop should be such that its range of resonance is substantially less than the sweep range of the main oscillator 14; and preferably, it should be close to the center frequency of the sweep, i.e., about 1 megacycle.

The operation of the above-descirbed system and the manner in which it achieves its improved results can be seen from the curves of FIG. 3. Curve a of FIG. 3 represents the output frequency of the main oscillator 14 as it varies in time. This variation, as shown follows a sinusoid pattern but is not so limited as long as it varies cyclically.

The cross hatched band b of FIG. 3 represents the resonance range of the coil 44 and capacitor 46 in the wafer 20. As the wafer 20 passes through the passageway 12 it encounters magnetic fields produced by the energization of the coil 10. These fields vary at a frequency which changes in accordance with curve *a* of FIG. 3. When these frequencies are in the region outside the band *b* of FIG. 3 (the resonance frequency of the coil 44 and capacitor 46 of the wafer), the coil and capacitor exhibit a high impedance and absorb very little energy from the field. However, as the frequency of the field variation moves into the resonance range at a regular rate, the frequency of this variation is set by the frequency control oscillator 24.

The varying frequency output of the main oscillator 14 energizes the coil 10, causing it to produce magnetic fields which vary in the same manner. As stated above, these signals are also supplied to the first signal detector 30. In the absence of metallic object in the vicinity of the coil 10, the impedance presented to the coil 10 remains high so that very little of the magnetic field energy surrounding the coil becomes dissipated. That is, nearly the entire magnetic field collapses back toward the coil 10 each time the current through it is reversed. Because very little energy is dissipated, the amount of energy seen by the first signal detector 30 remains high; and as a result, the output of the detector is as a result, the output of the detector is as shown in curve *b* of FIG. 3.

On the other hand, when a metallic object passes through the checkpoint 12, it tends to absorb energy from the fluctuating magnetic fields, so that the energy seen by the first signal detector 30 decreases substantially as incated in curve *c* of FIG. 3.

Now the coil 44 and capacitor 46 of the wafer 20 are connected to resonate only at certain frequencies well within the sweep range of the main oscillator 14, as indicated by band *d* in FIG. 3. These changes in resonance conditions represent a change in the impedance value which the circuit exhibits to the cyclically varying magnetic fields from the coil 10. Consequently, when the magnetic fields from the coil 10 vary at a frequency outside the resonant frequency of the wafer circuit, its impedance is relatively high and the energy level sensed by the first signal detector 30 is high. However, as the frequency of the magnetic fields shifts into the resonance region (band *d*) of the wafer circuit, the circuit begins to resonate and to absorb large amounts of energy from the magnetic field. This absorption occurs rather suddenly depending, of course, upon the selectivity or Q of the resonant circuit made up by the coil 44 and capacitor 46. The resulting effect on the first signal detector 30 is illustrated by curve *e* in FIG. 3. It will be noted that the resonant circuit in the wafer 20 produces a series of sharply defined pulses which occur each time the output frequency passes through the resonant range of the wafer circuit. Thus, the pulses are produced at twice the output frequency of the frequency control oscillator 24. These pulses also contain other frequency components, namely the 500 cycle per second component of the frequency control oscillator 24 and the 1 megacycle component of the main oscillator 14. These known components are eliminated or attenuated in the R-F filter 32 and in the 500 cycles per second "notch'" filter 34. The resulting pulses then become detected in the pulse detector 38 which in turn activates the relay 40 to turn on the alarm 42.

It will be noted that system will not respond to the passage through the checkpoint 12 of metallic artciles even though they may actually absorb more field energy than the wafer circuit 20. This is because most metallic articles do not possess the frequency selectivity of the wafer circuit and their energy absorption properties are such that substantially the same amount of energy is absorbed over the entire frequency sweep range of the main oscillator 14. Thus the signals seen by the first signal detector 30 are rather even as illustrated in the curve *c* of FIG. 3. Since this curve is not punctuated by pulses, the pulse detector 38 will not operate to energize the relay 40.

On the other hand, the resonant circuit of the wafer 20, while not having an especially high power absorption characteristic, nevertheless does possess a sharply defined resonance characteristic; and this operates in conjunction with the shifting main oscillator frequency to absorb power in well defined surges which result in the development of pulses suitable for being detected and for operating the relay 40.

FIG. 4 shows a circuit diagram for the various components of the system of FIG. 1. As shown in FIG. 4, there is provided a power supply circuit 50 which includes a plug 52 for tapping into a conventional AC power supply, a fuse 54 and a main control switch 56. The primary side of a power supply transformer 58 is connected in series with the plug 52, the fuse 54 and the switch 56. The secondary of the transformer 58 is center tapped to ground by means of a lead 60; and its extremities are connected to diagonally opposed junctions of a full wave rectifier circuit 62. The remaining junctions of the rectifier circuit 62 are connected respectively to positive and negative voltage conductors 64 and 66 which supply direct current voltages to the various components of the system. Filter capacitors 68 are connnected between the positive and negative voltage conductors 66 and 64 and ground to smooth out the fluctuations in the DC voltages which occur upon rectification of the applied alternating current.

The frequency control oscillator 24, as shown, takes the form of a conventional R-C tuned oscillator. This oscillator includes an NPN transistor 70 having emitter and collector terminals which are connected respectively to ground and through an output resistor 71 to the positive voltage supply line 64. A frequency control network, made up of a series of capacitors 72 and a pair of shunt connected resistors 74, is arranged in the base circuit of the transistor 70.

The output of the frequency control oscillator 24 is taken from the collector terminal of the transistor 70 and is communicated via an output capacitor 76 through a voltage divider network to the base terminal of an amplifying transistor 72, in the amplifier 26. The voltage divider network comprises a pair of resistors 82 and 84 which are connected between the positive voltage supply line 64 and ground. This voltage divider network serves to maintain a proper bias upon the amplifying transistor 80. The transistor 80 is also of the NPN type, and has its collector and emitter terminals connected respectively between the positive voltage supply line 64 and a ground connected resistor 86.

The main oscillator 14 incorporates an NPN transistor 90 connected to form a transistorized version of the well known Colpitts oscillator circuit. This circuit has a tuning or tank portion formed in part by a coil 92 and a pair of capacitors 94 and 96. These capacitors serve to make up the tuning circuit 22. The first capacitor 94 is actually a variable capacitance semiconductor diode which, for high frequencies exhibits a capacitance which varies with the voltage applied across it. This applied voltage is taken from the emitter terminal of the amplifying transistor 80. Thus the effective capacitance of the diode 94 varies in accordance with the output of the transistor 80. The rate at which this variation in capacitance occurs is thus equal to the output frequency of the control oscillator 24, which, in the illustrative system is set for five hundred cycles per second.

The variation in the capacitance of the element 94 produces a corresponding variation in the resonant frequency of the tank circuit of the main oscillator 14. This in turn causes the main oscillator to shift its output frequency in accordance with these variations. As indicated previously the basic frequency of the main oscillator 14 in the illustrative circuit has been chosen to be one megacycle and the frequency sweep has been chosen to cover 0.1 megacycle on either side thereof.

The coil 92 forms the primary of a transformer 98 whose output is amplified in a further transistor 100 and is then supplied to the junction point 28. As shown, the field coil 10 is connected to the junction point 28 and is energized by the current supplied from the main oscillator 14. The fields of the electromagnetic waves generated in the vicinity of the field coil 10 intercept the wafer 20 when it passes through the checkpoint 12. When this occurs, as indicated previously, the resonant circuit comprising the coil 44 and the capacitor 46 in the wafer 20 resonates and absorbs some of the wave energy during certain selected portions of the frequency sweep undergone by the waves. Because this energy absorption takes place only during selected portions of the frequency sweep, the energy level at the field coil 10 changes abruptly and at particular intervals.

The energy level at the junction point 28 is detected by means of the first signal detector 30 which, as shown, may take the form of a conventional rectifier diode. The detected energy, as would be expected, contains frequency components of both the frequency control oscillator 24 and the main oscillator 14. The RF filter 32 serves to remove most of the components resulting from the main oscillator 14. This filter is known as a $m$ derived pi section filter, and it comprises a series connected coil 102 with a pair of shunt connected capacitors 104 on either side thereof, and a shunt connected resistor 106. The output of the RF filter 32 is applied to an amplifying transistor 110 of the PNP variety in the "notch filter" 34. The notch filter also includes a resistor-capacitor network 112 located at the output of the transistor 110. This resistor-capacitor network serves to remove the five hundred cycle components from the rectified signals. The remaining portions of the signals are supplied to the pulse amplifier 36 where they are impressed upon the base terminal of a further amplifying transistor 114. The output of pulse amplifier is supplied to the pulse detector 38 where it passes through a pair of series connected capacitors 116 and 118, a transistor 120, and a pulse transformer 122.

It will be appreciated that the only signals which pass through the various networks to the secondary of the pulse transformer 122 are those signals which fluctuate abruptly at a frequency less than that of the main oscillator 14 and greater than that of the frequency control oscillator 24. As can be seen from the diagram of FIG. 3, signals having such frequency characteristics are those which result from the variations in energy level when the main oscillator 14 output sweeps back and forth across the resonant frequency spectrum of the wafer circuit. The output of the pulse transformer is applied to a two stage transistor amplifier 124 in the relay circuit 40. The output of this amplifier energizes a relay coil 128, and this in turn closes a pair of normally opened contacts 130 which serves to turn on the alarm 42.

A modified arrangement embodying the present invention is shown in FIG. 5. According to this modified arrangement there are provided separate transmitting and receiving coils 130 and 132 on opposite sides, respectively, of a checkpoint 134. A man 136 is shown passing through the checkpoint 134, and carrying with him a book 138 into the binding of which a wafer 140, similar to the wafer 20 of FIG. 2, is affixed. This arrangement is particularly useful for protecting libraries and similar depositories.

The transmitting coil 130 is energized from a transmitting unit 142 which contains the frequency control oscillator 24, the amplifier 26 the tuning circuit 22 and the main oscillator 14 of FIG. 1. The receiving coil 132 on the other hand is connected to a receiving system 144 which contains the first signal detector 30, the RF filter 32, the notch filter 34, the amplifier 36 and the pulse detector 38 of FIG. 1. A relay and alarm unit 146 is connected to the output of the receiving system 144 to be actuated whenever pulses occur from the receiving system at a proper repetition rate.

In the arrangement of FIG. 5, the fields generated at the transmitting coil 130 pass across the checkpoint 134 and are picked up by the receiving coil 132. These fields induce currents of corresponding frequency in the coil 132; and this in turn energizes or actuates the receiving system 144. When the wafer 140 passes between the two coils 130 and 132 it intercepts and absorbs or otherwise diverts the electromagnetic fields which vary at the resonant of tuned frequency of the wafer circuit. By providing for separation of field generating and receiving coils in this manner, a greater distance can be monitored with the system, and hence, the system will accommodate a larger checkpoint.

It will be appreciated that the present invention can be adapted for use in connection with electric as well as magnetic fields. FIG. 6 shows an arrangement whereby use is made of such electric or electrostatic fields in this connection. As shown in FIG. 6, a pair of capacitor plates 150 and 152 are positioned facing each other on opposite sides, respectively, of a checkpoint 154. These plates may be made of wood, plastic plaster or similar backing material with a conductive paint or foil surface formed thereon. A coil 156 is connected across the plates 150 and 152 to form a resonant circuit for impedance matching purposes. The circuit formed by the coil 156 and the capacitive plates 150 and 152, as shown, is connected between ground and the common junction 28. This common junction, as in the case of the embodiment of FIG. 1 is connected to both the main oscillator 14 and the first signal detector 30; and these latter components are connected to the remainder of the system as shown in FIG. 1.

The capacitive plates 150 and 152 become energized by the main oscillator 14 and generate a varying electrostatic field across the checkpoint 154. The energy contained in certain frequency components of the electrostatic field will be absorbed by a resonant circuit tuned to such frequencies when the resonant circuit passes through the checkpoint 154. This selective absorption of energy results in the production of alarm signals as explained in connection with FIGS. 1 and 3.

The effectiveness of the tuned circuit which passes through a checkpoint can be improved by increasing the physical size of its reactive components. FIG. 7 shows such an arrangement in connection with a package or carton. As shown, there is provided a carton 160 within which an article of machinery 162 or other article to be protected is located. Sheets 164 of metal foil, foil tape, or other conductive media are provided along parallel sides of the carton and extend substantially over the entire area of these sides. There is thus formed an enlarged capacitor across the body of the carton 160. The sheets 164 are connected to a miniature tuned circuit 166 located elsewhere in the carton 160. FIGS. 8 and 9 show alternate configurations for the tuned circuit 166. As shown in FIG. 8, the circuit comprises a coil 168 with a ferrite core 170 and a capacitor 172 in parallel with the coil. Leads 174 from across the coil and capacitor extend out to the sheets 164, thus placing the capacitor formed by them in circuit with the coil 168 and capacitor 172. The sheets 164 provide an expansive area for achieving significant amounts of energy absorption, while the coil 168 with its ferrite core 170 provides close control of the resonance frequency of the overall tuned circuit. FIG. 8b shows an alternate arrangement where there is provided a coil 176 formed in spiral fashion on a card 178 so that it itself has a relatively large surface area. A capacitor 180 is connected across the coil 176 and leads 182 are provided across the coil 176 and capacitor 180 for connection to the sheets 164.

What is claimed as new and desired to be secured by Letters Patent is:

1. A method of preventing the unauthorized taking of articles of merchandise from an enclosure having at least one limited egress facility, said method including the steps of attaching to individual ones of said articles, a resonant electrical circuit operable to absorb energy from electromagnetic waves of a given frequency present in the space surrounding said circuit, confining the exit of all articles leaving said enclosure to a path through said limited egress facility, continuously generating electromagnetic waves at said egress facility and causing the frequency of said waves to sweep through a frequency range, including said given frequency at a given repetition rate, receiving electromagnetic waves at said egress facility, filtering from the received waves their frequency components in the vicinity of said frequency range, filtering from the remaining components those components in the vicinity of said repetition rate, detecting the occurrence of pulses in the remaining components, and producing an alarm signal in response to such pulses, thereby indicating the unauthorized taking of articles from said enclosure.

2. A method as in claim 1 wherein said waves are generated by supplying alternating currents to a coil.

3. A method as in claim 2 wherein said frequencies are within a range such that said electromagnetic waves are primarily inductive in nature and radiated energy is minimized.

4. A method as in claim 3 wherein said alternating currents are supplied to a junction and from said junction to said coil, and wherein the energy level changes at said junction are received.

5. A method as in claim 1 wherein said waves are generated by supplying alternating currents to a coil and said monitoring is accomplished by measuring the variations in said currents.

6. A sstem for detecting the unauthorized removal of articles from an enclosure, said system comprising means defining a limited egress facility from said enclosure, a wave generator arranged to generate electromagnetic waves in the vicinity of said limited egress facility, sweep means arranged in conjunction with said wave generator to shift the frequency of said electromagnetic waves over a given range at a given repetition rate, radio receiver means for receiving electromagnetic wave energy at said egress facility said radio receiver means including first filter means for removing from the received electromagnetic wave energy those components in the vicinity of said given range, further filter means for removing from the remaining components of the received electromagnetic wave energy, those components in the vicinity of said given repetition rate, pulse detector means arranged to detect the presence of pulses in the remaining components, alarm means coupled to the output of said pulse detector means to be actuated thereby, individual resonant electrical circuits positioned on articles within said enclosure, said resonant electrical circuits being operable to resonate and absorb electromagnetic wave energy in the presence of said circuits at a frequency within said given range, whereby said alarm means is actuated whenever articles previously arranged with said resonant electrical circuits are moved past said limited egress facility.

7. Apparatus as in claim 6 wherein said absorption means comprises an enlarged reactive element extending over a large surface area and a smaller electrical circuit connected with said enlarged reactive element to form a resonant electrical circuit.

8. Apparatus as in claim 7 wherein said enlarged reactive element comprises a pair of conductive surfaces mounted in spaced apart facing relationship to form a capacitor.

9. Apparatus as in claim 7 wherein said enlarged reactive element comprises a coil spirally wound on a flat surface.

10. Apparatus as in claim 7 wherein said enlarged reactive element is formed over the surface of a container for accommodating an article to be protected.

11. Apparatus as in claim 6 wherein said radio receiver means includes a further coil separate and disconnected from said first mentioned coil and positioned across said checkpoint from said first coil.

12. Apparatus as in claim 6 wherein said wave generator comprises a reactive circuit including a pair of enlarged conductive surfaces positioned facing each other across said checkpoint to generate electrostatic fields thereacross.

13. Apparatus as in claim 6 wherein said wave generator is constructed to produce electromagnetic waves which are primarily inductive in nature whereby loss of energy through radiation is minimized.

14. Apparatus as in claim 6 wherein said wave generator comprises a tunable oscillator and a coil connected to the output of said oscillator.

15. Apparatus as in claim 14 wherein said sweep means comprises a further oscillator arranged to produce an output which changes the tuning of said tunable oscillator.

16. Apparatus as in claim 14 wherein said sweep means includes means for causing the frequency output of said tunable oscillator to sweep across said given frequency spectrum cyclically at a given repetition rate.

17. Apparatus as in claim 6 wherein said sweep means is constructed to produce a shift in frequency of said generating which is greater than and includes the energy absorption spectrum of said electronic circuit.

18. Apparatus as in claim 15 wherein said tunable oscillator is formed with a tank circuit including therein a voltage controllable variable capacitance element and wherein said further oscillator is constructed to produce a voltage output across said variable capacitance element.

19. Apparatus as in claim 6 wherein said electronic circuit comprises a coil and a capacitor connected to form a resonant loop.

20. Apparatus as in claim 19 wherein said coil and capacitor are embedded in a wafer-like holder.

References Cited

UNITED STATES PATENTS

| | | | |
|---|---|---|---|
| 2,147,746 | 2/1939 | Luck et al. | 340—258 |
| 2,646,559 | 7/1953 | Nutzler | 340—258 |
| 2,693,525 | 11/1954 | Kendall et al. | |
| 2,774,060 | 12/1956 | Thompson | 340—276 X |
| 3,115,622 | 12/1963 | Jaffe. | |

FOREIGN PATENTS 763,681  5/1934  France.

JOHN W. CALDWELL, Primary Examiner

D. L. TRAFTON, Assistant Examiner

U.S. Cl. X.R.

340—280

UNITED STATES PATENT AND TRADEMARK OFFICE
CERTIFICATE OF CORRECTION

PATENT NO. : 3,500,373

DATED : March 10, 1970

INVENTOR(S) : ARTHUR J. MINASY

It is certified that error appears in the above-identified patent and that said Letters Patent are hereby corrected as shown below:

In the Drawings:

Fig. 1, add the reference numerals -- 12a -- and -- 12b -- with lead lines extending, respectively, to the coils lying along one side and the bottom of checkpoint 12;

Fig. 4, remove the dot from the intersection between the leftmost vertical line connected via a resistor to the base of the transistor 110 and the horizontal ground line;

change the connection of the lower end of the primary of the transformer 122 from the positive line 64 to the negative line 66.

In the Specification:

Column 3, line 71, reverse the position of the reference numerals "10" and "12";

Column 4, line 66, change "descirbed" to -- described --;

UNITED STATES PATENT AND TRADEMARK OFFICE
CERTIFICATE OF CORRECTION

PATENT NO. : 3,500,373
DATED : March 10, 1970
INVENTOR(S) : ARTHUR J. MINASY

It is certified that error appears in the above-identified patent and that said Letters Patent are hereby corrected as shown below:

Column 9, line 31, change "sstem" to -- system --;

Column 10, line 10, change "checkpoint" to -- egress facility-- line 14, change "checkpoint" to -- egress facility--

Column 10, line 33, change "generating" to -- generator --.

Signed and Sealed this

Twenty-second Day of August 1978

[SEAL]

Attest:

RUTH C. MASON
Attesting Officer

DONALD W. BANNER
Commissioner of Patents and Trademarks